May 21, 1963 J. ABRAMS 3,090,470
LOCKING DEVICE FOR SHOPPING CARTS
Filed Aug. 3, 1960 2 Sheets-Sheet 1
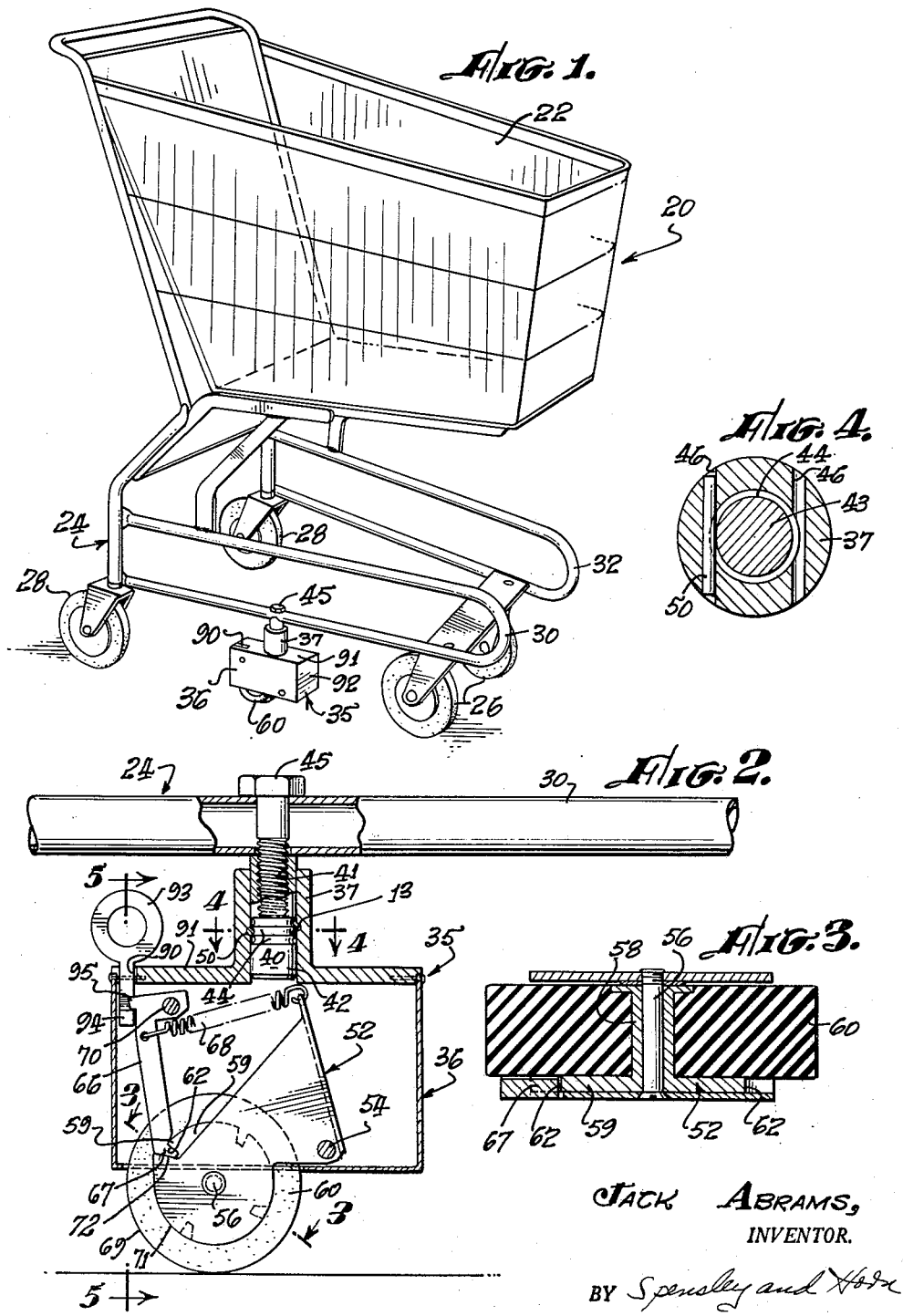
Jack Abrams,
INVENTOR.
BY Spensley and Horn
ATTORNEYS.

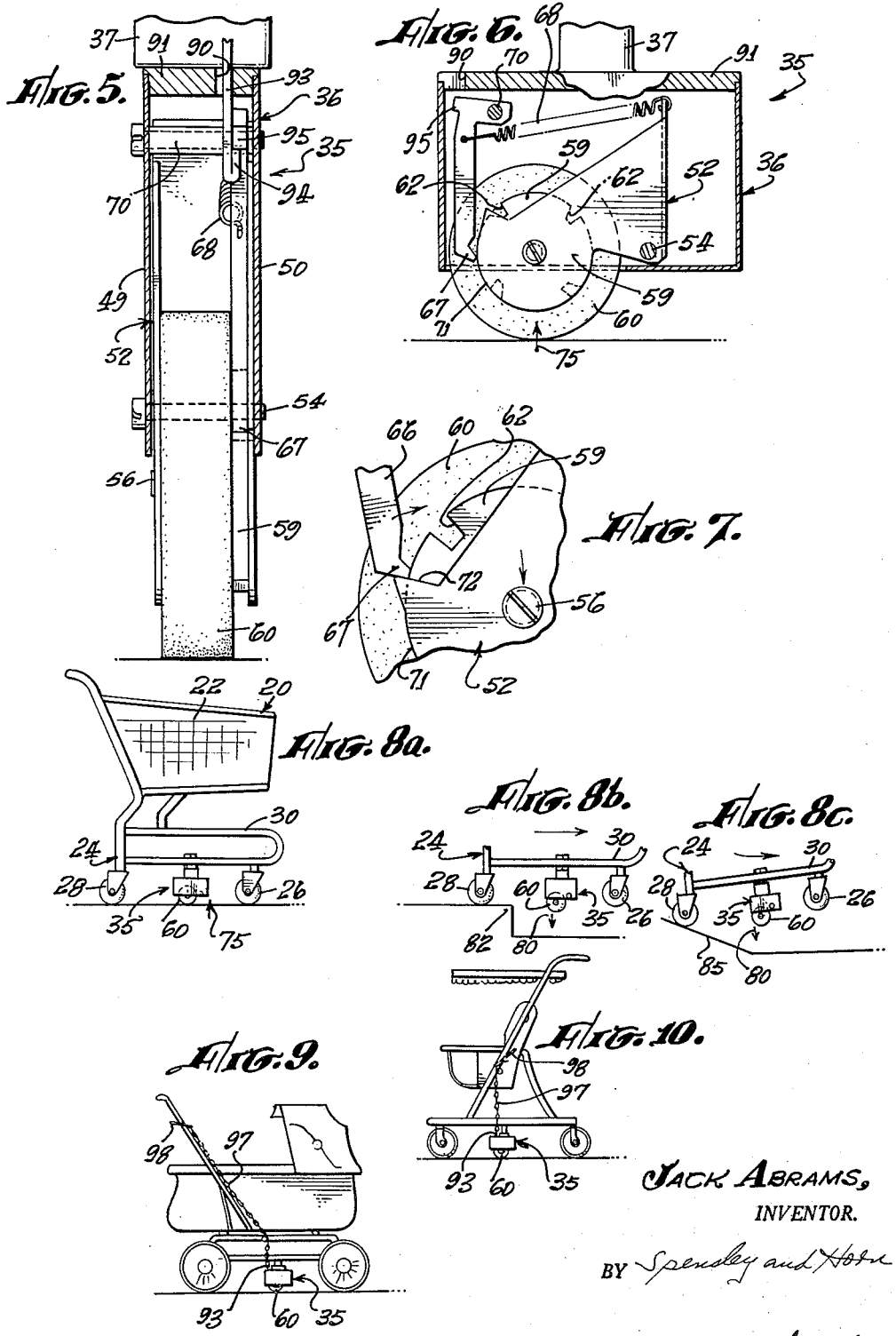

United States Patent Office 3,090,470
Patented May 21, 1963.

3,090,470
LOCKING DEVICE FOR SHOPPING CARTS
Jack Abrams, Studio City, Calif., assignor to The Concepts Co., Beverly Hills, Calif., a partnership
Filed Aug. 3, 1960, Ser. No. 47,283
5 Claims. (Cl. 188—110)

This invention relates to shopping carts, and more particularly, to a new and improved device to be connected to such carts in order to protect them from loss, pilferage and other nuisances while not interfering with their normal utility.

While the presently preferred embodiment of this invention is concerned with the provision of a device for the above intended purpose, it may also be employed as a braking device in connection with other vehicles such as a baby stroller or carriage.

In recent years, with the increased acceptance of the modern self-service super markets there has come into widespread use an exceedingly large number of shopping carts, sometimes called market baskets. These baskets are normally provided for the customer's use while shopping, as he must serve himself.

As these carts can be readily wheeled by the shopper and are easily accessible to him, there is a tendency for them to be removed from the stores' premises either for purposes of intentional appropriation or through innocent thoughtlessness. In either event, the continuing loss of these rather expensive items has become a problem of major concern to the store owners. The present invention provides a device for attachment to the present art shopping cart which greatly reduces the loss of such carts. In addition, the present invention device may be used in connection with other vehicles to act as a brake under certain circumstances.

Basically, the present invention provides a sensing element which discerns abrupt changes in elevation of the surface over which the vehicle is driven. Upon sensing such a change, it will automatically extend a member in the downward direction which member will remain extended. This member also presents an impediment to further motion of the vehicle thus effectively acting as a brake.

In accordance with the presently preferred embodiment of this invention, there is provided a device adaptable for attachment to the underside of a present art shopping cart. The attachment includes an upper extending vertical cylindrical member to permit rotation through 360° of the main body of the device which includes a rotatable wheel thus providing a swivel action. Suspended from the vertical member is a housing which supports the rotatable wheel. The wheel is pivotably mounted with the pivot arm being spring biased so as to cause the wheel to ordinarily assume the same positions with the plane of the surface over which the cart is driven as the other wheels of the cart. Should the wheel within the housing suddenly no longer be urged upward by the terrain below, as when the cart is driven off the curb, the wheel will automatically extend to a position below the plane defined by the wheels of the cart. The wheel will upon assuming this extended position, become locked by a pivoted member so as to prevent its return to its normal elevation. The wheel will also automatically be locked against rotation by a second pivoted member which is spring biased by engaging an extending member associated with the wheel. Finally, a key member is provided which may be inserted within the housing to disengage the locking pivot member so that the cart may again be freely driven until it should subsequently be driven over a surface which presents an abrupt change in elevation.

A primary object of the present invention is to provide a device for attachment to a movable vehicle while not interfering with the usual function of such vehicle.

An object of the present invention is to provide a motion retarding device for attachment to a movable vehicle which will retard motion upon an abrupt change in elevation of the surface over which the vehicle is driven.

A further object of the present invention is to provide an attachment to a shopping cart which will discourage its removal from the immediate environment of a market.

Yet a further object is to provide an attachment of the character described which will prevent further motion of the cart should it be driven over a surface having an abrupt change in elevation.

A still further object of the present invention is to provide a device of the character described which can be easily disengaged so that the cart to which it is attached may again be driven in its normal manner.

The novel features which are believed to be characteristic of the invention, both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

In the drawings:

FIGURE 1 is a perspective view of a present art market basket showing the presently preferred embodiment of this invention attached thereto;

FIGURE 2 is an enlarged view, partly in section, of the device of the present invention in the locked position showing how it is attached to the underside of the cart of FIGURE 1;

FIGURE 3 is a view taken along line 3—3 of FIGURE 2;

FIGURE 4 is a view taken along line 4—4 of FIGURE 2;

FIGURE 5 is a view taken along line 5—5 of FIGURE 2;

FIGURE 6 is a view similar to FIGURE 2 showing the wheel in the unlocked position;

FIGURE 7 is an enlarged view of the locking mechanism of FIGURES 2 and 6;

FIGURE 8a is front elevation showing a market basket with the present invention device attacheed thereto as it would appear when on level ground;

FIGURE 8b shows the lower portion only of the basket of FIGURE 8a as it goes off a curb causing the wheel to assume the locked position;

FIGURE 8c is a view similar to 8b showing the wheel assuming the locked position when the cart is driven over a depression;

FIGURE 9 is a side elevation showing how the device of the present invention may be used as a safety brake on a baby carriage;

FIGURE 10 is a side elevation of a baby stroller showing how the device of the present invention may be attached thereto for use as a safety brake.

Referring now to the drawing, and more particularly to FIGURE 1, there is shown a market basket or shopping cart generally designated by the numeral 20. The cart includes a basket 22 supported on a wheeled frame 24, carrying front wheels 26 and rear wheels 28. The wheels are rotatably mounted beneath basket supporting members 30 and 32.

The present invention device numbered 35 in its preferred form is attached to supporting member 30. The device 35 includes a generally hollow rectangular housing 36 open at the bottom. A cylindrically shaped hollow cylinder 37 extends upwardly from the housing 36. The cylinder 37 is adapted to receive a cylindrically shaped shaft 40 which includes a solid lower section 42 and a hollow upper section 41 which is internally threaded. Intermediate the upper and lower sections 41 and 42 is a central section 43 which defines one or more parallel circular grooves 44, three grooves being shown in the illustrative embodiment. This may best be seen in FIGURE 2. The threaded portion 41 is adapted to receive a threaded bolt 45 which extends through a vertical hole provided therefor through member 30 to secure the device 35 to the shopping cart 20. A plurality of horizontal holes 46 are provided within the inner wall of the cylinder 37 (see FIGURE 4). Thus, height adjustment of the device 35 may be effected by the insertion of a pin 50 within the appropriate groove 44 and hole 46. Further, the device may rotate freely about shaft 40 through 360°.

Within the housing, there is pivotably mounted a wheel supporting member or lever arm 52. Member 52 is pivotably connected to both of the vertical walls 49 and 50 of the housing 35 by a pin 54 (see FIGURE 5). The member 52 carries a shaft 56 near one end thereof. The shaft 56 supports a journal 58 about which the wheel 60 rotates. The journal 58 and wheel 60 are fixed together as a single component. Integral with the journal 58 is a disc shaped or circular member 59 which is disposed toward the end of the shaft 56 as may best be seen in FIGURE 3. The disc shaped member 59 includes a plurality of slots 62 about the periphery thereof. In the particular embodiment shown, as may best be seen in FIGURE 2, the number of slots provided is four. A second pivotably mounted element or lever arm 66 is supported within the housing in a manner similar to that of element 52. The second element 66 is arranged to have an extending finger 67 to fit into the slots 62 under certain circumstances hereinafter to be explained. A spring 68 interconnects the two pivoting members 52 and 66. The spring is connected at the upper end of the member 52 at a substantial distance from its pivot 54 while, on the other hand, it connects to the member 66 at a point close to the pivot 70 of member 66. The spring thus serves to urge the pivot member 66 in the direction toward the right, as FIGURE 2 is viewed, while it tends to urge the member 52 to pivot toward the left when viewed from the same position.

It would therefore appear that the wheel 60 while it is supported by shaft 56 would tend to be urged in the downward direction and that the member 66 would tend to become engaged with one of the slots 62 within disc shaped member 60 but for the interference presented by the arcuate shaped end portion 71 of member 52 (see FIGURE 6). In ordinary use the wheel will assume the position as shown in FIGURE 6 as an upward force will be exerted by the surface of the ground as indicated by arrow 75. Thus, the wheel will tend to remain free to rotate in the plane of the terrain over which the four wheels of the cart together with the wheel 60 of the device of the present invention is driven. This is shown schematically in FIGURE 8a. Thus, it is clear that when the basket is driven over a level surface, the device of the present invention by which a fifth wheel is added to a present art shopping cart, will not at all interfere with its ordinary operation.

The element 52 is a pivoted lever arm with an arcuate outer end 71, and having a diameter substantially equal to the diameter of the slotted circular member 59. An indentation is provided in the pivoted lever arm 52 in order to provide a flat portion thereof at 72 thus reducing the diameter to less than that of the slotted member 59. It is on this flat portion that the extension 67 of the pivoting member 66 can slide in order to prevent member 52 from being forced upward and to permit engaging one of the slots 62 within the member 59 to thus lock the wheel 60 from rotating as was hereinbefore mentioned. Thus, the wheel will remain extended and will no longer be free to rotate. Again referring to FIGURE 6, it can be seen therein that the reaction force of the ground pushing up against the wheel as indicated by the arrow 75 keeps the pivoting lever arm 52 in its upper position so that arcuate section thereof contacts the end 67 of the lever arm 66 preventing it from becoming locked in any of the slots in member 59, and when the force 75 is no longer present as when a sudden depression appears in the ground, the wheel 60 and arm 52 will become locked.

While one spring 68 is shown in the present embodiment, it will, of course, be obvious that two separate springs could be used to urge the levers 66 and 52 in the direction indicated. That is, one spring could be attached to one wall of the housing and to each of the members 52 and 66 respectively in order to separately perform the function of spring 68.

In FIGURE 7 there is shown an enlarged view indicating how the extension 67 of lever 66 comes into engagement with the edge 72 of the lever arm 52 when it is in the lower position in a situation as was discussed hereinabove wherein the upward force 75 is no longer exerted against the wheel 60, and wherein locking element 52 is in its down position. At the time shown in FIGURE 7 the wheel has not as yet rotated to its locked position. When the wheel is rotated slightly, slot 62 will be opposite extension 67 and extension 67 will advance into slot 62 thereby locking the wheel from further rotation.

In FIGURE 8a there is shown a shopping cart to which there has been attached the device 35. Therein, the wheel 60 is held in the same plane as defined by the other wheels by the reaction force 75 exerted by the level surface. In FIGURE 8b the wheel 60 is shown to be extended in the downward direction as indicated by arrow 80 causing it to become locked in this position due to the absence of a force such as 75 as the cart is driven off from a curb 82 which presents an abrupt change in elevation.

Similarly in FIGURE 8c the wheel 60 is shown to be locked in the extended non-rotatable position as the cart is driven down a sharp change in ground level 85, as for example, a driveway.

In order to release the wheel 60 after it has become locked as explained hereinabove, the opening 90 is provided in the upper wall 91 of the housing 36. A key 93 including a finger 94 at the end thereof to engage the extension 95 at the upper end of lever arm 66, is provided. Thus, if the key is inserted through the opening 90 and pulled upwardly it will pivot the lever arm 66 about the pivot 70 so that its extending finger 67 will be removed from the slot 62 of the disc 59, and edge 72 of element 52.

Thus, it is clear that the present invention device, if attached as indicated in FIGURES 9 and 10 to a baby stroller and carriage, it would serve as an automatic brake. That is, if the carriage or stroller should inadvertently roll away from where it may have been left unattended, it will immediately stop rolling upon meeting a surface with an abrupt change in elevation, such as a curb, sharply sloped driveway, and the like.

In the FIGURES 9 and 10 embodiments, the key member 93 is permanently disposed within the housing and the upper end of the key member 93 is connected through chain 97 to a setting lever 98 in order to permit the user to unlock the device after the wheel has become locked as was explained hereinabove in connection with FIGURES 1–8.

There has thus been described a new and improved locking device to be used in connection with a shopping cart or the like in order to automatically cause the same to be retarded from further motion upon passing over a surface having an abrupt change in elevation. The device of the present invention is especially adapted to a shopping market cart in such a manner as not to interfere with the normal nesting feature of such baskets. That is, as the device 35 is attached to one of the lower side extending members, a plurality of baskets can be nested one within the other without interference resulting from the addition of the present invention locking device.

What is claimed as new is:

1. In a shopping cart of the nesting type including a wheeled frame and a basket supported by said frame, a device for ready attachment to the underside of said cart, said device comprising: an auxiliary wheel pivotably supported by said device, said auxiliary wheel being pivotally movable in response to its own weight from a first position in which the lowermost surface of said auxiliary wheel lies substantially within the plane tangent to the lowermost surfaces of the cart wheels to a second position a predetermined distance below said first position; means mounting said auxiliary wheel for rotation; and a locking mechanism associated with said auxiliary wheel for selectively locking said auxiliary wheel against rotation when said auxiliary wheel is in said second position, said locking mechanism including a disc mounted on the means mounting said auxiliary wheel, said disc defining a plurality of peripheral slots therein, a spring biased lever arm pivotally mounted to said device and normally urged towards said disc for engagement in one of the said slots, and means for preventing said lever arm from entering one of said slots unless said auxiliary wheel is in said second position.

2. In a shopping cart of the nesting type including a wheeled frame and a basket supported by said frame, a device for ready attachment to the underside of said cart, said device comprising: means for a swivel connection to permit the same to rotate through 360°, a housing joined at said swivel connection; an auxiliary wheel pivotably supported by said housing for partial retraction therewithin, said auxiliary wheel being pivotally movable in response to its own weight from a first partially retracted position in which the lowermost surface of said auxiliary wheel lies substantially within the plane tangent to the lowermost surfaces of the cart wheels to a second position a predetermined distance below said first position, means mounting said auxiliary wheel for rotation; a locking mechanism associated with said auxiliary wheel for selectively locking said auxiliary wheel against rotation when said auxiliary wheel is in said second position, said locking mechanism including a disc mounted on the means mounting said auxiliary wheel, said disc defining a plurality of peripheral slots therein, a spring biased lever arm pivotally mounted within said housing and normally urged towards said disc for engagement in one of said slots, and means for preventing said lever arm from entering one of said slots unless said auxiliary wheel is in said second position.

3. In a shopping cart of the nesting type including a wheeled frame and a basket supported by said frame, a device for ready attachment to the underside of said cart, said device comprising: means for swivel connection to permit the same to rotate through 360°; a housing joined at said swivel connection; an auxiliary wheel pivotably supported within said housing for partial variable extension therefrom; a shaft mounting said auxiliary wheel for rotation, said shaft and said auxiliary wheel being supported by a first lever arm one end of which defines an arcuate surface of a predetermined diameter and a flat portion extending radially inwardly therefrom to a terminus, said first lever arm being pivotally movable in response to the weight of said auxiliary wheel from a first position in which the lowermost surface of said auxiliary wheel lies substantially within the plane tangent to the lowermost surfaces of the cart wheels to a second position a predetermined distance below said first position; a disc mounted upon said shaft between said auxiliary wheel and said first lever arm and for rotation with said auxiliary wheel, said disc having an outside diameter intermediate that of said arcuate surface of said first lever arm and said terminus, said disc defining a plurality of peripheral slots therein; a spring biased second lever arm pivotally mounted within said housing and normally urged towards said disc for engagement in one of said slots, said second lever arm being prevented from entering one of said slots by said arcuate position of said first lever arm unless said auxiliary wheel is in said second position.

4. In a shopping cart of the nesting type including a wheeled frame and a basket supported by said frame, a device for ready attachment to the underside of said cart, said device comprising: means for swivel connection to permit the same to rotate through 360°; a housing joined at said swivel connection; an auxiliary wheel pivotally supported within said housing for partial variable extension therefrom; a shaft mounting said auxiliary wheel for rotation; a first lever arm pivotally mounted to said housing and supporting said shaft and said auxiliary wheel, said first lever arm defining an arcuate surface of a predetermined diameter and a flat portion extending radially inwardly therefrom to a terminus, said first lever arm being pivotally movable in response to the weight of said auxiliary wheel from a first position in which the lowermost surface of said auxiliary wheel lies substantially within the plane tangent to the lowermost surfaces of the cart wheels to a second position a predetermined distance below said first position; a disc mounted upon said shaft between said auxiliary wheel and said first lever arm and for rotation with said auxiliary wheel, said disc having an outside diameter intermediate that of said arcuate surface of said first lever arm and said terminus, said disc defining a plurality of peripheral slots therein; a spring biased second lever arm pivotally mounted within said housing and normally urged toward said disc for engagement in one of said slots, said second lever arm being prevented from entering one of said slots by said arcuate position of said first lever arm unless said auxiliary wheel is in said second position; and key means receivable within an opening defined by said housing for insertion therewithin to selectively disengage said second lever arm from said one of said slots.

5. A device for ready attachment to a wheeled vehicle for automatically retarding further motion of the vehicle when it is driven over a surface presenting an abrupt change in elevation, said device comprising: a housing adapted for mounting to the wheeled vehicle; an auxiliary wheel pivotally supported by said housing for partial retraction therewithin, said auxiliary wheel being pivotally movable in response to its own weight from a first partially retracted position to a second position a predetermined distance below said first position, the lowermost surface of said auxiliary wheel lying substantially within the plane tangent to the lowermost surfaces of the wheels of said vehicle when said auxiliary wheel is in said first position with said housing mounted to said vehicle; means mounting said auxiliary wheel for rotation; and a locking mechanism associated with said auxiliary wheel for locking said auxiliary wheel against rotation when said auxiliary wheel is in said second position, said locking mechanism including a disc mounted on the means mounting said auxliary wheel and for rotation with said auxiliary wheel, said disc defining a plurality of peripheral slots therein, a spring biased lever arm pivotally mounted to the interior of said housing, said lever arm being normally urged toward said disc for engagement in one of said slots, and means for preventing said lever arm from entering one of said slots unles said auxiliary wheel is in said second position.

References Cited in the file of this patent
UNITED STATES PATENTS

| | | |
|---|---|---|
| 418,928 | Ridge | Jan. 7, 1890 |
| 881,751 | Weant | Mar. 10, 1908 |
| 1,429,771 | Raymond | Sept. 19, 1922 |
| 1,967,151 | Lustick | July 17, 1934 |
| 2,396,743 | Morris | Mar. 19, 1946 |
| 2,542,865 | Fullmer | Feb. 20, 1951 |
| 2,774,986 | Moorehouse | Dec. 25, 1956 |
| 2,841,249 | Allen | July 1, 1958 |
| 2,964,140 | Berezny | Dec. 13, 1960 |
| 3,002,370 | La Brie | Oct. 3, 1961 |